United States Patent
Klatt et al.

(10) Patent No.: US 6,306,941 B1
(45) Date of Patent: Oct. 23, 2001

(54) FLAME-PROOF THERMOPLASTIC MOULDING MATERIALS

(75) Inventors: Martin Klatt, Mannheim; Thomas Heitz, Dannstadt-Schauernheim; Brigitte Gareiss, Obersülzen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/254,591

(22) PCT Filed: Aug. 29, 1997

(86) PCT No.: PCT/EP97/04708

§ 371 Date: Mar. 10, 1999

§ 102(e) Date: Mar. 10, 1999

(87) PCT Pub. No.: WO98/11160

PCT Pub. Date: Mar. 19, 1998

(30) Foreign Application Priority Data

Sep. 13, 1996 (DE) ............................... 196 37 368

(51) Int. Cl.$^7$ ............................... C08K 3/26
(52) U.S. Cl. ............... 524/119; 524/117; 524/425; 524/426
(58) Field of Search ............... 524/119, 117, 524/424, 425, 436

(56) References Cited

U.S. PATENT DOCUMENTS

| | | |
|---|---|---|
| 3,530,094 | 9/1970 | Schnell et al. . |
| 3,535,280 | 10/1970 | Schnell et al. . |
| 3,789,091 | 1/1974 | Anderson et al. . |
| 4,460,731 * | 7/1984 | Kochanowski et al. ............... 524/451 |
| 4,504,608 * | 3/1985 | Kishida et al. ............... 524/451 |
| 4,506,050 * | 3/1985 | Hergenrother et al. ............... 524/143 |
| 4,618,633 * | 10/1986 | Taubitz et al. ............... 524/119 |
| 4,632,946 | 12/1986 | Muench et al. . |
| 4,654,413 * | 3/1987 | Takahashi ............... 528/274 |
| 4,866,114 | 9/1989 | Taubitz et al. . |
| 5,298,547 * | 3/1994 | Gareiss et al. ............... 524/425 |
| 5,464,894 * | 11/1995 | Gareiss et al. ............... 524/425 |
| 5,859,147 * | 1/1999 | Torre et al. ............... 524/119 |

FOREIGN PATENT DOCUMENTS

| | | |
|---|---|---|
| 2138904 | 6/1995 | (CA) . |
| 3248902 | 6/1995 | (CA) . |
| 1 260 135 | 2/1968 | (DE) . |
| 75 863 | 4/1983 | (EP) . |
| 192 154 | 8/1985 | (EP) . |
| 62-218445 * | 9/1987 | (JP) . |
| 63-120758 * | 5/1988 | (JP) . |
| 93/18914 | 9/1993 | (WO) . |

* cited by examiner

*Primary Examiner*—Veronica P. Hoke
(74) *Attorney, Agent, or Firm*—Keil & Weinkauf

(57) ABSTRACT

Thermoplastic molding compositions comprise

A) from 5 to 97% by weight of a thermoplastic polymer selected from the group consisting of polyamides, polyesters, polyphenylene ethers, vinylaromatic polymers and mixtures of these, B) from 1 to 30% by weight of an alkylphosphonic acid compound of the formula I

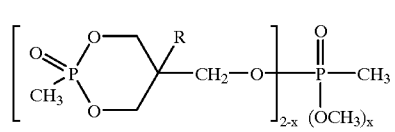

where R is alkyl having from 1 to 4 carbon atoms and x is 0 or 1, C) from 1 to 30% by weight of a synergist for B) selected from the group consisting of inorganic calcium and magnesium compounds and mixtures of these, D) from 1 to 50% by weight of a fibrous filler and E) from 0 to 40% by weight of other additives and processing aids, where the sum of the percentages by weight of components A) to E) is always 100%.

5 Claims, No Drawings

FLAME-PROOF THERMOPLASTIC MOULDING MATERIALS

The invention relates to thermoplastic molding compositions comprising
- A) from 5 to 97% by weight of a thermoplastic polymer selected from the group consisting of polyamides, polyesters, polyphenylene ethers, vinylaromatic polymers and mixtures of these,
- B) from 1 to 30% by weight of an alkylphosphonic acid compound of the formula I

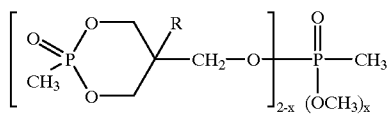

where R is alkyl having from 1 to 4 carbon atoms and x is 0 or
- C) from 1 to 30% by weight of a synergist for B) selected from the group consisting of inorganic calcium and magnesium compounds and mixtures of these,
- D) from 1 to 50% by weight of a fibrous filler and
- E) from 0 to 40% by weight of other additives and processing aids, where the sum of the percentages by weight of components A) to E) is always 100%.

The invention also relates to the use of the novel thermoplastic molding compositions for producing shaped articles of any type and to the shaped articles obtainable in this way.

One of the disadvantages of halogen-containing flame-retardant thermoplastics is that they are toxicologically questionable, and they are increasingly being replaced by halogen-free flame-retardant thermoplastics.

Important requirements for flame-retardant systems of this type are, in particular, a pale inherent color, adequate thermal stability when being incorporated into the thermoplastics and retention of efficacy when fibrous fillers are added; addition of such fillers adversely affects the flame-retardant action ("wicking" effect of glass fibers).

Besides thermoplastics which contain red phosphorus, there are four other halogen-free flame retardants.
1. Inorganic flame retardants based on hydroxides or carbonates, especially of magnesium, which must be employed in large amounts to give adequate efficacy;
2. Nitrogen-containing flame retardants, such as melamine cyanurate, which usually only give adequate flame retardancy in unreinforced thermoplastics;
3. Phosphorus compounds, such as triphenylphosphine oxide, which have an undesirable plasticizing side-effect in many thermoplastics;
4. Ammonium polyphosphates and melamine phosphate, which do not have adequate thermal stability at above 200° C.

Alkylphosphonic acid compounds and their efficacy as flame retardants in thermoplastics are known from U.S. Pat. No. 3,789,091, DE-A 44 41 022 and DE-A 44 06 857. From the two German applications it is clear to the person skilled in the art that addition of an alkylphosphonic acid compound gives good flame retardancy (class V-0 in UL 94) in unreinforced transparent (amorphous) polyamides or mixtures of these with partially crystalline polyamides, and that additives may be added to polyamides of this type.

However, it would be desirable to have a flame-retardant partially crystalline PA product without the addition of amorphous polyamides, since the latter reduce the chemical and heat resistance. For glass-fiber-reinforced polyamides, the efficacy of the alkylphosphonic acid compounds is inadequate, since the UL 94 classification is only V-2 with dripping of flaming particles from the specimens.

It is not advisable to increase the amount of phosphonic acid compound since the additive sweats out during processing (mold deposit) and the mechanical properties are very adversely affected (plasticizing property of the phosphorus compound).

It is an object of the present invention to provide a halogen-free flame retardant which is suitable for reinforced polyamides, polyesters, PPE and vinylaromatic polymers and which shows goods flame retardancy with adequate crust formation and without dripping flaming particles.

We have found that this object is achieved by the molding compositions defined at the outset. Preferred embodiments are given in the subclaims.

Surprisingly, addition of inorganic magnesium and/or calcium compounds and alkylphosphonic acid compounds gives a synergistic flame-retardant effect in reinforced thermoplastics, such as polyesters, polyamides, in particular partially crystalline polyamides, PPE and vinylaromatic polymers and mixtures of these. The UL 94 classification V-0 is achieved by the combination according to the invention and the specimens do not drip flaming particles.

The novel molding compositions comprise, as component A), from 5 to 97, preferably from 10 to 93 and in particular from 30 to 80% by weight, of a thermoplastic polymer selected from the group consisting of polyamides, polyesters, polyphenylene ethers, vinylaromatic polymers and mixtures of these.

1. Polycarbonates and polyesters

Suitable polycarbonates (frequently also called aromatic polyesters) are known per se. They can be prepared, for example, by the processes described in DE-B-1 300 266 by interfacial polycondensation or by the process described in DE-A-14 95 730 by reaction of biphenyl carbonate with bisphenols. The preferred bisphenol is 2,2-di(4-hydroxyphenyl)propane, referred to in general and below as bisphenol A.

Instead of bisphenol A, other aromatic dihydroxy compounds can also be used, in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane or 4,4-dihydroxydiphenyl, and mixtures of these.

Particularly preferred polycarbonates are those based on bisphenol A or bisphenol A together with up to 30 mol % of the abovementioned aromatic dihydroxy compounds.

The viscosity ratio of these polycarbonates is in general in the range 1.1 to 1.5, in particular from 1.28 to 1.4 (measured at 25° C. in a 0.5% strength by weight solution in dichloromethane).

Suitable polyesters are likewise known per se and are described in the literature. They contain, in their primary chain, an aromatic ring which derives from an aromatic dicarboxylic acid. The aromatic ring can also be substituted, eg. by halogen, such as chlorine or bromine, or by $C_1$–$C_4$-alkyl, such as methyl, ethyl, isopropyl, n-propyl, n-butyl, isobutyl or tert-butyl.

The polyesters can be prepared by reaction of aromatic dicarboxylic acids or their esters or other ester-forming derivatives with aliphatic dihydroxy compounds in a manner known per se.

Preferred dicarboxylic acids which may be mentioned are naphthalenedicarboxylic acid, terephthalic acid and isophthalic acid and mixtures of these. Up to 10 mol % of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols with from 2 to 6 carbon atoms, in particular 1,2-ethanediol, 1,4-butanediol, 1,6-hexanediol, 1,4-hexanediol, 1,4-cyclohexanediol and neopentyl glycol, and mixtures of these.

Particularly preferred polyesters which may be mentioned are polyalkylene terephthalates which derive from alkanediols with from 2 to 6 carbon atoms. Polyethylene terephthalate, polyethylene naphthalate and polybutylene terephthalate are particularly preferred.

The viscosity number of the polyesters is generally in the range from 60 to 200 ml/g (measured in a 0.5% strength by weight solution in a phenol/o-dichlorobenzene mixture (weight ratio 1:1 at 25° C.)).

2. Vinylaromatic polymers

The molecular weight of these polymers, which are known and commercially available, is generally in the range from 1500 to 2,000,000, preferably in the range from 70,000 to 1,000,000.

Vinylaromatic polymers of styrene, chlorostyrene, α-methylstyrene and p-methylstyrene may be mentioned in a purely representative capacity; comonomers such as (meth)acrylonitrile or (meth)acrylates may be included in the structure of the polymer in subordinate amounts (preferably not more than 20, in particular not more than 8, % by weight). Particularly preferred vinylaromatic polymers are polystyrene and impact-modified polystyrene. Mixtures of these polymers may, of course, also be employed. Preparation is preferably by the process described in EP-A-302 485.

Preferred ASA polymers are constructed from a soft or elastomeric phase comprising a graft polymer of:

$A_1$ from 50 to 90% by weight of a graft base, based on
  $A_{11}$ from 95 to 99.9% by weight of a $C_2$–$C_{10}$-alkyl acrylate and
  $A_{12}$ from 0.1 to 5% by weight of a bifunctional monomer with two non-conjugated olefinic double bonds, and
$A_2$ from 10 to 50% by weight of a graft of
  $A_{21}$ from 20 to 50% by weight of styrene or substituted styrenes of the formula I or mixtures of these, and
  $A_{22}$ from 10 to 80% by weight of acrylonitrile, methacrylonitrile, acrylates or methacrylates or mixtures of these,
in a mixture with a rigid matrix based on an SAN copolymer $A_3$) of:
  $A_{31}$ from 50 to 90, preferably from 55 to 90 and in particular from 65 to 85, % by weight of styrene and/or substituted styrenes of the formula I and
  $A_{32}$ from 10 to 50, preferably from 10 to 45 and in particular from 15 to 35, % by weight of acrylonitrile and/or methacrylonitrile.

Component $A_1$) is an elastomer whose glass transition temperature is below –20, in particular less than –30° C.

For the preparation of the elastomer, the primary monomers $A_{11}$) employed are acrylates with from 2 to 10 carbon atoms, in particular from 4 to 8 carbon atoms. Particularly preferred monomers which may be mentioned are tert-butyl, isobutyl and n-butyl acrylates and 2-ethylhexyl acrylate, of which the last two named are particularly preferred.

Besides these acrylates, a polyfunctional monomer with at least two non-conjugated olefinic double bonds is employed in amounts of from 0.1 to 5, in particular from 1 to 4, % by weight, based on the total weight $A_{11}$+$A_{12}$. Preferred polyfunctional monomers are bifunctional compounds, ie. compounds with two non-conjugated double bonds. Examples which may be mentioned are divinylbenzene, diallyl fumarate, diallyl phthalate, triallyl cyanurate, triallyl isocyanurate, tricyclodecenyl acrylate and dihydrodicyclopentadienyl acrylate, of which the last two are preferred.

Processes for the preparation of the graft base $A_1$ are known per se and described, for example, in DE-B 1 260 135. Corresponding products are also available commercially.

Preparation by emulsion polymerization has proven particularly advantageous in some cases.

The exact polymerization conditions, in particular the type, amount and metering method of the emulsifier are preferably selected so that the acrylate latex, which has been at least partially crosslinked, has a mean particle size (weight average $d_{50}$) in the range from about 200 to 700, in particular from 250 to 600 nm. The latex preferably has a narrow particle size distribution, ie. the quotient $$Q = \frac{d_{90} - d_{10}}{d_{50}}$$

is preferably less than 0.5, in particular less than 0.35.

The proportion of the graft base $A_1$ in the graft copolymer $A_1$+$A_2$ is from 50 to 90, preferably from 55 to 85 and in particular from 60 to 80, % by weight, based on the total weight of $A_1$+$A_2$.

A graft shell $A_2$ is grafted onto the graft base $A_1$; the graft shell $A_2$ can be obtained by copolymerization of $A_{21}$ from 20 to 90, preferably from 30 to 90 and in particular from 30 to 80, % by weight of styrene or of substituted styrenes of the formula

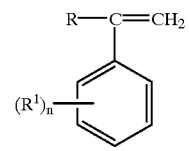

where R is alkyl with from 1 to 8 carbon atoms, hydrogen or halogen and $R^1$ is alkyl with from 1 to 8 carbon atoms or halogen and n is 0, 1, 2 or 3, and $A_{22}$ from 10 to 80, preferably from 10 to 70 and in particular from 20 to 70, % by weight of acrylonitrile, methacrylonitrile, acrylates or methacrylates or mixtures of these.

Examples of substituted styrenes are α-methylstyrene, p-methylstyrene, p-chlorostyrene and p-chloro-α-methylstyrene, of which styrene and α-methylstyrene are preferred.

Preferred acrylates or methacrylates are those whose homopolymers or copolymers with the other monomers of component $A_{22}$ have glass transition temperatures of greater than 20° C.; however, other acrylates may in principle also be employed, preferably in such amounts that component $A_2$ as a whole has a glass transition temperature $T_g$ greater than 20° C.

Acrylates or methacrylates of $C_1$–$C_8$-alcohols and epoxy esters such as glycidyl acrylate and glycidyl methacrylate are particularly preferred. Very particularly preferred examples are methyl methacrylate, tert-butyl methacrylate, glycidyl methacrylate and n-butyl acrylate, where the latter, because of its property of forming polymers with very low $T_g$, is preferably not employed in an excessively high proportion.

The graft shell $A_2$) can be prepared in one or more, for instance in two or three, process steps, the overall composition remaining unaffected.

The graft shell is preferably prepared in emulsion, eg. as described in German Patent 12 60 135, DE-A-32 27 555, DE-A-31 49 357 and DE-A-34 14 118.

Depending on the selected conditions, the graft copolymerization gives a certain proportion of free copolymers of styrene or substituted styrene derivatives and (meth) acrylonitrile or (meth)acrylates.

The graft copolymer $A_1+A_2$ generally has a mean particle size of from 100 to 1,000 nm, in particular from 200 to 700 nm, ($d_{50}$ weight average). The conditions in the preparation of the elastomer $D_1$) and in the grafting are therefore preferably selected so as to give particle sizes in this range. Measures for this are known and are described, eg. in German Patent 1 260 135 and in DE-A-28 26 925 and also in Journal of Applied Polymer Science, Vol. 9 (1965), pp. 2929 to 2938. The enlargement of particle size of the elastomer latex can be brought about by agglomeration, for example.

For the purposes of the present invention, the graft polymer ($A_1+A_2$) also includes the free non-grafted homo- and copolymers formed during the graft copolymerization for the preparation of component $A_2$).

Some preferred graft polymers are given below:

1: 60% by weight of graft base $A_1$ comprising
   $A_{11}$ 98% by weight of n-butyl acrylate and
   $A_{12}$ 2% by weight of dihydrodicyclopentadienyl acrylate and 40% by weight of graft shell $A_2$ comprising
   $A_{21}$ 75% by weight of styrene and
   $A_{22}$ 25% by weight of acrylonitrile 2: Graft base as in 1 having 5% by weight of a first graft shell comprising styrene and
   35% by weight of a second graft component comprising
   $A_{21}$ 75% by weight of styrene and
   $A_{22}$ 25% by weight of acrylonitrile 3: Graft base as in 1 having 13% by weight of a first graft component comprising styrene and 27% by weight of a second graft component comprising styrene and acrylonitrile in a weight ratio of 3:1.

The products present as component $A_3$) may be prepared, for example, by the process described in DE-B-10 01 001 and DE-B-1003 436, and are also available commercially. The weight-average molecular weight determined by light scattering is preferably in the range from 50,000 to 500,000, in particular from 100,000 to 250,000.

The ($A_1+A_2$):$A_3$ weight ratio is in the range from 1:2.5 to 2.5:1, preferably from 1:2 to 2:1 and in particular from 1:1.5 to 1.5:1.

SAN copolymers suitable as component A) are described above (see $A_{31}$ and $A_{32}$).

The viscosity number of the SAN copolymers, measured according to DIN 53 727 as 0.5% strength by weight solution in dimethylformamide at 23° C., is generally in the range from 40 to 100, preferably from 50 to 80 ml/g.

ABS polymers as polymer (A) in the multiphase polymer mixtures of the invention have the same structure as described above for ASA polymers. In place of the acrylate rubber $A_1$) of the graft base in the case of the ASA copolymer, conjugated dienes are usually employed, preferably giving the following formulation of the graft base $A_4$:

$A_{41}$ from 70 to 100% by weight of a conjugated diene and
$A_{42}$ from 0 to 30% by weight of a bifunctional monomer with two non-conjugated olefinic double bonds The graft $A_2$ and the hard matrix of the SAN copolymer $A_3$) remain unchanged in the formulation. Products of this type are commercially available and their preparation processes are known to the person skilled in the art, so that further details here are unnecessary.

The ($A_4+A_2$):A3 weight ratio is in the range from 3:1 to 1:3, preferably from 2:1 to 1:2.

Particularly preferred formulations of the novel molding compositions comprise as component A) a mixture of:

$A_1$) from 10 to 90% by weight of a polybutylene terephthalate
$A_2$) from 0 to 40% by weight of a polyethylene terephthalate
$A_3$) from 1 to 40% by weight of an ASA or ABS copolymer or mixtures of these Products of this type are obtainable from BASF AG under the trademark Ultradur® S (previously Ultrablend® S).

Other preferred formulations of component A) comprise
$A_1$) from 10 to 90% by weight of a polycarbonate
$A_2$) from 0 to 40% by weight of a polyester, preferably polybutylene terephthalate,
$A_3$) from 1 to 40% by weight of an ASA or ABS polymer or mixtures of these.

Products of this type are available from BASF AG under the trademark Terblend®.

3. Polyamides

The polyamides in the novel molding compositions generally have a viscosity number of from 90 to 350, preferably from 110 to 240, ml/g, as determined in a 0.5% strength by weight solution in 96% by weight strength sulfuric acid at 25° C. according to ISO 307.

Preference is given to semicrystalline or amorphous resins with a molecular weight (weight average) of at least 5000, as described for example in U.S. Pat. Nos. 2,071,250, 2,071,251, 2,130,523, 2,130,948, 2,241,322, 2,312,966, 2,512,606 and 3,393,210.

Examples of these are polyamides derived from lactams with from 7 to 13 ring members, such as polycaprolactam, polycaprylolactam and polylaurolactam, and polyamides obtained by reaction of dicarboxylic acids with diamines.

Dicarboxylic acids which may be employed are alkanedicarboxylic acids with from 6 to 12, in particular from 6 to 10, carbon atoms, and aromatic dicarboxylic acids. Adipic acid, azelaic acid, sebacic acid and dodecanedioic acid, and terephthalic and/or isophthalic acid may be mentioned merely as examples.

Particularly suitable diamines are alkanediamines with from 6 to 12, in particular from 6 to 8, carbon atoms, and m-xylylenediamine, di(4-aminophenyl)methane, di(4-aminocyclohexyl)methane, 2,2-di(4-aminophenyl)propane and 2,2-di(4-aminocyclohexyl)propane.

Preferred polyamides are polyhexamethyleneadipamide, polyhexamethylenesebacamide and polycaprolactam, and nylon-6/6,6 copolymers, in particular with from 5 to 95% by weight of caprolactam units.

Other polyamides are, for example, those obtainable by condensation of 1,4-diaminobutane with adipic acid at elevated temperature (nylon-4,6). Preparation processes for polyamides of this structure are described, for example, in EP-A 38 094, EP-A 38 582 and EP-A 39 524.

Other suitable polyamides are those obtained by copolymerization of two or more of the abovementioned monomers, and mixtures of a plurality of polyamides in any desired ratio.

Furthermore, such partly aromatic copolyamides as nylon-6/6,T and nylon-6,6/6,T, where these include less than 0.5% by weight, preferably less than 0.3% by weight, of triamine, have proven especially advantageous (see EP-A 299 444).

The preferred partially aromatic copolyamides with low triamine content can be prepared by the methods described in EP-A 129 195 and 129 196.

4. Polyphenylene Ethers

Suitable polyphenylene ethers generally have a molecular weight (weight average) in the range from 10,000 to 80,000, preferably from 20,000 to 60,000 and in particular 40,000 to 55,000.

The molecular weight distribution is generally determined by gel permeation chromatography, for which PPE specimens are dissolved in THF under superatmospheric pressure at 110° C. and 0.16 ml of a 0.25% strength solution is injected onto suitable separating columns, using THF as eluent. Detection is generally by UV detector. The separating columns are expediently calibrated using PPE specimens of known molecular weight distribution.

This corresponds to a reduced specific viscosity $\eta_{red}$ of from 0.2 to 0.9 dl/g, preferably from 0.35 to 0.8 dl/g and in particular from 0.45 to 0.6 dl/g, measured in a 0.5% strength by weight solution in chloroform at 25° C.

The unmodified polyphenylene ethers $a_1$) are known per se and are preferably prepared by oxidative coupling of o-disubstituted phenols.

Examples of substituents are halogen, such as chlorine or bromine, and alkyl radicals with from 1 to 4 carbon atoms, preferably without a tertiary hydrogen atom at the α-position, such as methyl, ethyl, propyl or butyl. The alkyl radicals may themselves be substituted by halogen, such as chlorine or bromine, or by hydroxyl. Other examples of possible substituents are alkoxy radicals, preferably with up to 4 carbon atoms, and phenyl radicals, which may be unsubstituted or substituted by halogen and/or alkyl. Copolymers of various phenols, such as copolymers of 2,6-dimethylphenol and 2,3,6-trimethylphenol, are likewise suitable. Mixtures of various polyphenylene ethers may, of coure, also be employed.

The polyphenylene ethers used as component $a_1$) may, if desired, include process-derived defects, for examples as described in White et al., Macromolecules 23, 1318–1329 (1990).

Preference is given to polyphenylene ethers which are compatible with vinylaromatic polymers, ie. are completely or very largely soluble in these polymers (cf. A. Noshay, Block Copolymers, p. 8–10, Academic Press, 1977 and O. Olabisi, Polymer-Polymer Miscibility, 1979, p. 117–189).

Examples of polyphenylene ethers are
poly(2,6-dilauryl-1,4-phenylene)ether,
poly(2,6-diphenyl-1,4-phenylene)ether,
poly(2,6-dimethoxy-1,4-phenylene)ether,
poly(2,6-diethoxy-1,4-phenylene)ether,
poly(2-methoxy-6-ethoxy-1,4-phenylene)ether,
poly(2-ethyl-6-stearyloxy-1,4-phenylene)ether,
poly(2,6-dichloro-1,4-phenylene)ether,
poly(2-methyl-6-phenyl-1,4-phenylene)ether,
poly(2,6-dibenzyl-1,4-phenylene)ether,
poly(2-ethoxy-1,4-phenylene)ether, poly(2-chloro-1,4-phenylene)ether and poly(2,5-dibromo-1,4-phenylene) ether. Preference is given to polyphenylene ethers in which the substituents are alkyl radicals with from 1 to 4 carbon atoms, such as
poly(2,6-dimethyl-1,4-phenylene)ether,
poly(2,6-diethyl-1,4-phenylene)ether,
poly(2-methyl-6-ethyl-1,4-phenylene)ether,
poly(2-methyl-6-propyl-1,4-phenylene)ether,
poly(2,6-dipropyl-1,4-phenylene)ether and
poly(2-ethyl-6-propyl-1,4-phenylene)ether.

Graft copolymers of polyphenylene ethers and vinylaromatic polymers, such as styrene, α-methylstyrene, vinyltoluene and chlorostyrene, are also suitable.

Functionalized or modified polyphenylene ethers are known per se for example from WO-A 86/02086, WO-A 87/00540, EP-A-222 246, EP-A-223 116 and EP-A-254 049, and are preferably employed for mixtures with polyamides or polyesters.

An unmodified polyphenylene ether $a_1$) is usually modified by incorporating at least one carbonyl, carboxy, anhydride, amide, imide, carboxylic ester carboxylate, amino, hydroxyl, epoxy, oxazoline, urethane, urea, lactam or halobenzyl group, so as to ensure adequate compatibility, for example with the polyamide.

The modification is generally carried out by reacting an unmodified polyphenylene ether $a_1$) with a modifier containing at least one of the abovementioned groups and at least one C—C double or triple bond, in solution (WO-A 86/2086), in aqueous dispersion, in a gas-phase process (EP-A-25 200) or in the melt, if appropriate in the presence of suitable vinylaromatic polymers or impact modifiers, if desired in the presence of free-radical initiators.

Suitable modifiers ($a_3$) are, for example, maleic acid, methylmaleic acid, itaconic acid and tetrahydrophthalic acid, and the anhydrides and imides of these, fumaric acid, and the mono- and diesters of these acids, eg. with $C_1$- and $C_2$-$C_8$-alkanols ($a_{31}$), the mono- or diamides of these acids, such as N-phenylmaleimide (monomer $a_{32}$), and maleohydrazide. Other examples are N-vinylpyrrolidone and (meth) acryloylcaprolactam ($a_{33}$).

Component A) in the novel molding compositions is preferably a modified polyphenylene ether obtainable by reaction of
  $a_1$) from 70 to 99.95, preferably from 76.5 to 99.94, % by weight of an unmodified polyphenylene ether,
  $a_2$) from 0 to 25, preferably from 0 to 20, % by weight of a vinylaromatic polymer,
  $a_3$) from 0.05 to 5, preferably from 0.05 to 2.5, % by weight of at least one compound from the group consisting of
    $a_{31}$) an α, β-unsaturated dicarbonyl compound,
    $a_{32}$) a monomer containing amide groups and a polymerizable double bond and
    $a_{33}$) a monomer containing lactam groups and a polymerizable double bond,
  $a_4$) from 0 to 5, preferably from 0.01 to 0.09, % by weight of a free-radical initiator,
where the percentages by weight are based on the total of $a_1$) to $a_4$) inclusive, for from 0.5 to 15 minutes at from 240 to 375° C. in suitable mixing and compounding apparatus, such as twin-screw extruders.

The vinylaromatic polymer $a_2$) should preferably be compatible, as described above under 2., with the polyphenylene ether employed.

Examples of preferred vinylaromatic polymers compatible with polyphenylene ethers can be found in the abovementioned monograph by Olabisi, p. 224–230 and 245.

Examples of free-radical initiators $a_4$) are:
2,4-dichlorobenzoyl peroxide, tert-butyl peroxide,
3,5,5-trimethylhexanoyl peroxide, lauroyl peroxide, decanoyl peroxide, propionyl peroxide, benzoyl peroxide, tert-butyl
2-ethylperoxyhexoate, tert-butyl peroxydiethylacetate, tert-butyl peroxyisobutyrate, 1,1-di-tert-butylperoxy-3,3,5-trimethylcyclohexane,
tert-butylperoxy isopropyl carbonate,
tert-butylperoxy-3,3,5-trimethylhexoate, tert-butyl peracetate,
tert-butyl perbenzoate, butyl 4,4-di-tert-butylperoxy valerate,
2,2-di-tert-butylperoxybutane, cumyl peroxide, tert-butylcumyl peroxide, 1,3-di(tert-butylperoxyisopropyl)benzene and tert-butyl peroxide. Mention may also be made of organic hydroperoxides, such as diisopropylbenzene hydroperoxide, cumene hydroperoxide, tert-butyl hydroperoxide, p-methyl hydroperoxide and pinane hydroperoxide and highly-branched alkanes of the structure

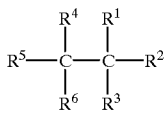

where $R^1$ to $R^6$ are alkyl with from 1 to 8 carbon atoms, alkoxy with from 1 to 8 carbon atoms, aryl, such as phenyl, naphthyl or 5- or 6-membered heterocyclic rings with a π-electron system and nitrogen, oxygen or sulfur as heteroatoms. The substituents $R^1$ to $R^6$ may themselves be substituted by functional groups, such as carboxyl, carboxyl derivatives, hydroxyl, amino, thiol or epoxide. Examples are 2,3-dimethyl-2,3-diphenylbutane, 3,4-dimethyl-3,4-diphenylhexane and 2,2,3,3-tetraphenylbutane.

Particularly preferred polyphenylene ethers A) in the novel molding compositions are those obtained by modification using maleic acid, maleic anhydride or fumaric acid. Polyphenylene ethers of this type preferably have an acid number of from 1.8 to 3.2, in particular from 2.0 to 3.0.

The acid number is a measure of the degree of modification of the polyphenylene ether and is generally determined by titration with bases under inert gas.

The acid number generally corresponds to the amount of base in mg which is required (according to DIN 53 402) for neutralization of 1 g of a polyphenylene ether B) which has been acid-modified as described.

The novel molding compositions comprise, as component B), from 1 to 30, preferably from 1 to 20 and in particular from 5 to 20, % by weight of an alkylphosphonic acid compound of the formula I

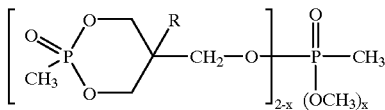

where R is a straight-chain or branched alkyl radical with from 1 to 4 carbon atoms, preferably ethyl, and x is 0 or 1.

Preference is given to mixtures of compounds I having an ethyl radical, where x can be 0 or 1. Mixtures of this type are commercially available under the trademark Antiblaze® 1045 (Albright and Wilson) or Hostaflam® OP 920 (Hoechst AG).

The novel molding compositions comprise, as component C), from 1 to 30, preferably from 1 to 20, particularly preferably from 5 to 20 and very particularly preferably from 10 to 15, % by weight of a synergist for component B), selected from the group consisting of inorganic calcium and magnesium compounds and mixtures of these.

Any desired compounds, such as hydroxides, carbonates, hydroxycarbonates, sulfates, silicates, phosphates and phosphonates may be used, magnesium hydroxide being preferred.

Magnesium silicates in various mixture ratios are particularly suitable, talc being preferred.

Typical formulations of talc can usually be determined by elemental analysis and consist essentially of (after burning) $SiO_2$, $MgO$, $Al_2O_3$, $Fe_2O_3$ and/or $CaO$.

Mixtures of the following have proven especially suitable $c_1$) a magnesium calcium carbonate of the general formula $Mg_xCa_y(CO_3)_{x+y} \cdot m\ H_2O$, where x and y are numbers from 1 to 5 and $x/y \geqq 1$ and $m \geqq 0$ and $c_2$) a basic magnesium carbonate of the formula $Mg_n(CO_3)_v(OH)_{2n-2v} \cdot w\ H_2O$, where n is a number from 1 to 6, v is a number greater than 0 and smaller than 6 and $n/v>1$ and $w \geqq 0$ where the $c_1$):$c_2$) mixing ratio is in the range from 1:1 to 3:1.

The magnesium calcium carbonates $c_1$) may be hydrated or anhydrous. Preference is given to the naturally occurring minerals, such as dolomite and huntite.

An anhydrous form in which x=3 and y=1, $Mg_3Ca(CO_3)_4$ (huntite), is particularly preferred.

The basic magnesium carbonates $c_2$) may likewise be employed in either hydrated or anhydrous form, and here too the naturally occurring minerals, such as hydromagnesite, a hydrated compound with n=5, v=4 and w=4, $Mg_5(CO_3)_4(OH)_2 \cdot 4\ H_2O$, are preferred.

The $c_1$):$c_2$) ratio is particularly preferably in the range from 1:1 to 2:1.

The novel molding compositions comprise, as component D), from 1 to 50, preferably from 5 to 40 and in particular from 10 to 30, % by weight of a fibrous filler.

Preferred fibrous fillers are carbon fibers, aramid fibers and potassium titanate fibers, where glass fibers of low-alkali glass are particularly preferred. These may be employed as rovings or as chopped strands in the forms which are commercially available.

The surfaces of the fibrous fillers may be pretreated with a silane compound, to give better compatibility with the thermoplastic.

Suitable silane compounds are those of the formula III $$(X-(CH_2)_n)_k-Si-(O-C_mH_{2m+1})_{4-K} \qquad \text{III}$$

where
X is $NH_2-$;

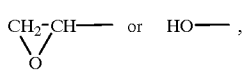

n is an integer from 2 to 10, preferably 3 or 4,
m is an integer from 1 to 5, preferably 1 or 2, or
k is an integer from 1 to 3, preferably 1.

Preferred silane compounds are aminopropyltrimethoxysilane, aminobutyltrimethoxysilane, aminopropyltriethoxysilane, aminobutyltriethoxysilane and the corresponding silanes which have glycidyl as substituent X.

The silane compounds are generally employed for surface coating in amounts of from 0.05 to 5, preferably from 0.5 to 1.5 and in particular from 0.8 to 1, % by weight (based on C).

Needle-shaped mineral fillers are also suitable

For the purposes of the invention, the term needle-shaped fillers is taken to mean mineral fillers with pronounced needle-shaped character, for example needle-shaped wollastonite. The mineral preferably has a L/D (length/diameter) ratio of from 8:1 to 35:1, preferably from 8:1 to 11:1. The mineral filler may, if desired, have been pretreated with the abovementioned silane compounds, but the pretreatment is not essential.

The novel molding compositions may comprise, as component E), up to 40, preferably up to 30, % by weight of other additives and processing aids, for example from 0 to 2% by weight of fluorine-containing ethylenic polymers. These ethylenic polymers have a fluorine content of from 55 to 76% by weight, preferably from 70 to 76% by weight.

Examples of these are polytetrafluoroethylene (PTFE), tetrafluoroethylene copolymers and tetrafluoroethylene copolymers having relatively small proportions (generally up to 50% by weight) of copolymerizable ethylenically unsaturated monomers. These are described, for example, by Schildknecht in "Vinyl and Related Polymers", Wiley, 1952, pages 484–494, and by Wall in "Fluoropolymers" (Wiley Interscience, 1972).

These fluorine-containing ethylenic polymers are homogeneously distributed in the compositions and preferably have a particle size $d_{50}$ (number average) in the range from 0.05 to 10 μm, in particular from 0.1 to 5 μm. These small particle sizes can particularly preferably be achieved by using aqueous dispersions of fluorine-containing ethylenic polymers and incorporating them into, for example, a polyester melt.

The additives may be, for example, impact modifiers (also referred to as elastomeric polymers or elastomers), which may be present in amounts of up to 20% by weight, preferably up to 15% by weight.

Suitable impact modifiers are the conventional rubbers, eg. ethylene copolymers having reactive groups, acrylate rubber and polymers of conjugated dienes, such as polybutadiene rubber and polyisoprene rubber. The diene polymers may be partially or completely hydrogenated, in a manner known per se. Other impact modifiers are, for example, hydrogenated styrene-butadiene rubber, ethylene-propylene-diene rubber, polybutylene and polyoctenamer rubbers, ionomers, block copolymers of vinylaromatic monomers with dienes, such as butadiene or isoprene (known per se from EP-A 62 282) with the $M^1M^2$-, $M^1M^2M^1M^2$- or $M^1M^2M^1$- structure, where these block polymers may also have segments with random distribution, and star block copolymers. Polymers of conjugated dienes, such as polybutadiene rubber and polyisoprene rubber, have proven especially suitable. Synthetic rubbers of this type are familiar to the person skilled in the art and are reviewed in "Ullmanns Encyklopädie der Technischen Chemie" 4th Edition, Vol. 13, pp. 595–634, Verlag Chemie GmbH, Weinheim 1977.

Other additives are, for example, thermal and light stabilizers, lubricants, mold-release agents and colorants, such as dyes and pigments, in the conventional amounts.

The additives may also be low-molecular-weight polymers, polyethylene wax being particularly preferred as lubricant.

The properties of the end products can to a large extent be controlled as desired by varying the type and amount of these additives.

The novel molding compositions can be prepared by processes known per se. In a preferred embodiment, the preparation is carried out by addition of the components B) and D) to the melt of component A).

For this, it is expedient to use extruders, for example single-screw or twin-screw extruders, or other conventional plastication apparatus, such as Brabender mixers or Banbury mixers.

If a thermoplastic polycondensate is present, the plastic mixtures may then be subjected to a further thermal treatment, ie. a postcondensation in the solid phase. The molding composition, in the form appropriate to the process, is conditioned in a conditioning apparatus, for example a tumbling mixer or a continuous or batch conditioning tube, until the desired viscosity number VN or relative viscosity $\eta_{rel}$ of, for example, the polyamide has been reached. The temperature range for the conditioning depends on the melting point of the pure component A). Preferred temperature ranges are from 5 to 50, preferably from 20 to 30° C. below the respective melting point of A). The process is preferably carried out in an inert gas atmosphere, preferred inert gases being nitrogen and superheated steam.

The residence times are generally from 0.5 to 50, preferably from 4 to 20, hours. Conventional apparatus are then employed to produce shaped articles from the molding compositions.

The novel molding compositions are distinguished by good processability (mold deposits are greatly reduced) and by good flame retardancy, in particular by the absence of dripping of flaming particles. Furthermore, the mechanical properties are to a very large extent retained due to the presence of the phosphorus compound. The compositions are therefore suitable for the production of fibers, films and shaped articles of any type, in particular for use in the electrical and electronic sectors, eg. lamp components, such as lamp sockets and lamp holders, plugs and multipoint connectors, coil formers, casings for capacitors or connectors, and circuit-breakers, relay housings and reflectors, and covers, computer cases and switch components.

EXAMPLES

Component A
 A1: Poly-ε-caprolactam with a viscosity number VN of 151 ml/g, measured as 0.5% strength solution in 96% strength by weight $H_2SO_4$ at 25° C. according to ISO 307; Ultramid® B3, BASF AG.
 A2: Nylon-6,6 with a VN of 148 ml/g, Ultramid® A3, BASF AG.
 A3: Nylon-6/6,6 (82:18) with a VN of 140 ml/g, Ultramid® C3, BASF AG.
 A4: Polybutylene terephthalate with a VN of 130 ml/g, measured in phenol/dichlorobenzene (1:1) at 25° C., Ultradur® B4500, BASF AG.

Component B

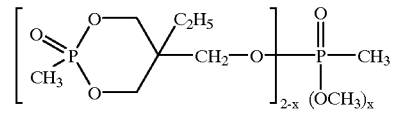

with x=0 and 1 (Antiblaze® 1045, Albright and Wilson).

Component C
 C1: Talc (IT Extra Norwegian Talc)
 Formulation from elemental analysis 60.2% $SiO_2$ 37.7% MgO 1% $Al_2O_3$ 0.9% $Fe_2O_3$ 0.5% CaO 5.7% ignition loss
 C2: Magnesium hydroxide (Magnifin® Se 465, Martinswerk GmbH)
 C3: A mixture of $Mg_3Ca(CO_3)_4$ (huntite) and $Mg_5(CO_3)_4(OH)_2 \cdot 4H_2O$ (hydromagnesite) in a ratio of 2:1 (Securoc®, Incemin AG)

Component D
 Silanized chopped glass fibers with a mean diameter of 10 μm.

Preparation of the thermoplastic molding compositions
Components A) to D) inclusive were mixed in the amounts shown in the table on a ZSK 25 at 5 kg/h and 120 rpm at 260° C., the resultant extrudate was cooled in a water bath and then granulated and dried in vacuo at 80° C. for 10 h. The chopped glass fibers were metered into the melt stream.

1/16" test specimens were prepared from the granules on an injection-molding machine at 260° C. and, after the usual conditioning, were tested according to UL 94 (flammability test).

The formulations of the compositions and the results of the measurements are given in the table.

TABLE

| Example | Formulation [% by weight] | | | | UL 94 1/16" | Flaming drops |
|---|---|---|---|---|---|---|
| 1C | 60 A1 | 15 B | — | 25 D | V2 | yes |
| 2C | 55 A1 | 20 B | — | 25 D | V2 | yes |
| 3C | 55 A1 | — | 20 C1 | 25 D | V2 | yes |
| 4 | 45 A1 | 15 B | 15 C1 | 25 D | V-0 | no |
| 5 | 45 A1 | 15 B | 15 C2 | 25 D | V-0 | no |
| 6 | 45 A1 | 15 B | 15 C3 | 25 D | V-0 | no |
| 7C | 60 A2 | 15 B | — | 25 D | V2 | yes |
| 8C | 55 A2 | 20 B | — | 25 D | V2 | yes |
| 9 | 45 A2 | 15 B | 15 C1 | 25 D | V-0 | no |
| 10 | 45 A2 | 15 B | 15 C2 | 25 D | V-0 | no |
| 11 | 45 A2 | 15 B | 15 C3 | 25 D | V-0 | no |
| 12C | 60 A3 | 15 B | — | 25 D | V2 | yes |
| 13C | 55 A3 | 20 B | — | 25 D | V2 | yes |
| 14 | 45 A3 | 15 B | 15 C1 | 25 D | V-0 | no |
| 15 | 45 A3 | 15 B | 15 C2 | 25 D | V-0 | no |
| 16 | 45 A3 | 15 B | 15 C3 | 25 D | V-0 | no |
| 17C | 65 A4 | 10 B | — | 25 D | V2 | yes |
| 18C | 65 A4 | — | 10 C1 | 25 D | V2 | yes |
| 19 | 55 A4 | 10 B | 10 C1 | 25 D | V-0 | no |
| 20 | 55 A4 | 10 B | 10 C2 | 25 D | V-0 | no |
| 21 | 55 A4 | 10 B | 10 C3 | 25 D | V-0 | no |

We claim:

1. A thermoplastic molding composition comprising
   A) from 5 to 97% by weight of a thermoplastic polymer selected from the group consisting of polyamides and mixtures of these,
   B) from 1 to 30% by weight of an alkylphosphonic acid compound of the formula I

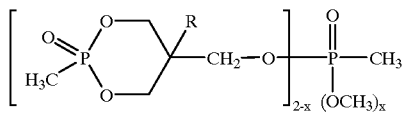

where R is alkyl having from 1 to 4 carbon atoms and x is 0 or 1,
   C) from 1 to 30% by weight of a mixture of
      $c_1$) a magnesium calcium carbonate of formula $$Mg_xCa_y(CO_3)_{x+y} \cdot m\ H_2O,$$

where x and y are numbers from 1 to 5 and $x/y \geq 1$ and $m \geq 0$, and
      $c_2$) a basic magnesium carbonate of formula $$Mg_n(CO_3)_v(OH)_{2n-2v} \cdot w\ H_2O,$$

where n is a number from 1 to 6, v is a number greater than 0 and smaller than 6 and $n/v > 1$ and $w \geq 0$,
   having a $c_1$):$c_2$) mixing ratio of from 1:1 to 3:1,
   D) from 1 to 50% by weight of a fibrous filler and
   E) from 0 to 40% by weight of other additives and processing aids,
   where the sum of the percentages by weight of components A) to E) is always 100%.

2. A thermoplastic molding composition as claimed in claim 1, where R in formula I of component B) is ethyl.

3. A thermoplastic molding composition as claimed in claim 1, in which component A) comprises nylon-6,6, nylon-6, nylon-6/6,T, nylon-6,6/6,T or nylon-6/6,6 or mixtures of these.

4. A thermoplastic molding composition as claimed in claim 1, in which component D) consists of glass fibers.

5. A shaped article obtainable from a thermoplastic molding composition as claimed in claim 1.

* * * * *